United States Patent
Lisowski et al.

(10) Patent No.: US 10,215,359 B2
(45) Date of Patent: Feb. 26, 2019

(54) INDICATOR OPTIC FOR VEHICLE LIGHTING MODULE

(71) Applicant: Gentex Corporation, Zeeland, MI (US)

(72) Inventors: Michael F. Lisowski, Holland, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/417,571

(22) Filed: Jan. 27, 2017

(65) Prior Publication Data
US 2017/0219181 A1    Aug. 3, 2017

Related U.S. Application Data

(60) Provisional application No. 62/288,855, filed on Jan. 29, 2016, provisional application No. 62/298,261, (Continued)

(51) Int. Cl.
*B60Q 1/26* (2006.01)
*B60Q 1/12* (2006.01)
(Continued)

(52) U.S. Cl.
CPC .............. *F21S 43/315* (2018.01); *B60Q 1/26* (2013.01); *B60Q 1/2665* (2013.01); *B60Q 9/008* (2013.01);
(Continued)

(58) Field of Classification Search
CPC ........ B60R 1/08; G02B 6/0001; F21S 43/241; F21S 43/235; F21S 43/236; F21S 43/242; F21S 43/243; F21S 43/315
(Continued)

(56) References Cited

U.S. PATENT DOCUMENTS 5,515,244 A * 5/1996 Levins .................. G01D 11/28
116/202
5,857,770 A * 1/1999 Fohl ..................... G02B 6/0018
362/511
(Continued)

OTHER PUBLICATIONS

International Search Report and Written Opinion of the International Searching Authority, or the Declaration, dated Jun. 8, 2017, for International Application No. PCT/US2017/015311, filed Jan. 27, 2017, 9 pages.

*Primary Examiner* — Jong-Suk (James) Lee
*Assistant Examiner* — Eric T Eide
(74) *Attorney, Agent, or Firm* — Price Heneveld LLP; Bradley D. Johnson

(57) ABSTRACT

A lighting module for a vehicle is disclosed. The lighting module comprises a light source configured to generate a light emission in an emission direction substantially along a forward operating direction of the vehicle. A circuit is in connection with the light source. The lighting module further comprises an optic device comprising a body forming a receiving surface. The receiving surface is configured to receive an input emission of the light emission. The optic device is configured to transmit the input emission through the body, emit a first portion of the input emission along a primary path directed toward a passenger compartment of the vehicle, and emit a second portion of the input emission along a stray light path into a light trap formed by the body and arranged substantially opposite the light extraction surface.

10 Claims, 12 Drawing Sheets

Related U.S. Application Data filed on Feb. 22, 2016, provisional application No. 62/312,177, filed on Mar. 23, 2016.

(51) Int. Cl.

| | |
|---|---|
| *F21S 8/10* | (2006.01) |
| *F21S 43/31* | (2018.01) |
| *B60R 1/12* | (2006.01) |
| *B60Q 9/00* | (2006.01) |
| *F21S 43/241* | (2018.01) |
| *F21S 43/243* | (2018.01) |
| *F21S 43/245* | (2018.01) |
| *F21S 43/247* | (2018.01) |

(52) U.S. Cl.
CPC .......... *B60R 1/1207* (2013.01); *F21S 43/241* (2018.01); *F21S 43/243* (2018.01); *F21S 43/245* (2018.01); *F21S 43/247* (2018.01)

(58) Field of Classification Search
USPC ........................................................ 362/555
See application file for complete search history.

(56) References Cited

U.S. PATENT DOCUMENTS

| | | | |
|---|---|---|---|
| 6,572,233 B1 | 6/2003 | Northman et al. | |
| 7,369,736 B2* | 5/2008 | Cha .................... | G02B 6/0096 359/598 |
| 7,427,150 B2 | 9/2008 | Carter et al. | |
| 9,028,119 B2* | 5/2015 | Lisowski ............... | F21S 43/14 362/516 |
| 2006/0146555 A1* | 7/2006 | Inaba .................. | B60Q 1/2665 362/494 |
| 2010/0182143 A1 | 7/2010 | Lynam | |
| 2014/0140081 A1* | 5/2014 | Takahashi ............ | B60Q 1/2665 362/509 |
| 2014/0177249 A1* | 6/2014 | Iseki .................... | B60Q 1/2665 362/511 |
| 2015/0036371 A1* | 2/2015 | Ichikawa .............. | B60Q 1/2665 362/511 |
| 2016/0078768 A1* | 3/2016 | Huizen ................. | G08G 1/167 340/435 |
| 2017/0089541 A1* | 3/2017 | Nakajima ............. | F21S 48/24 |

\* cited by examiner

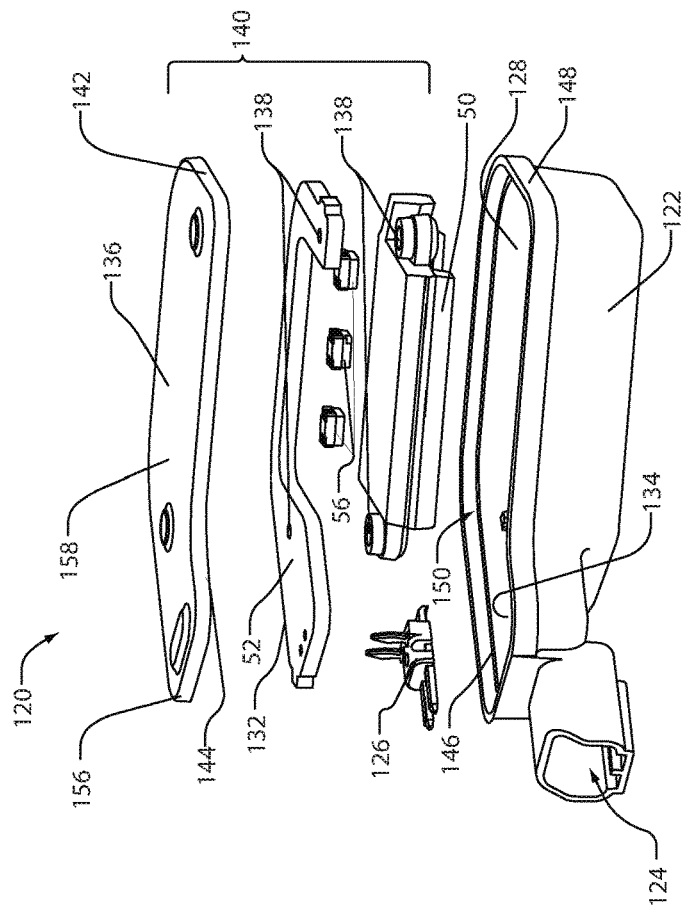
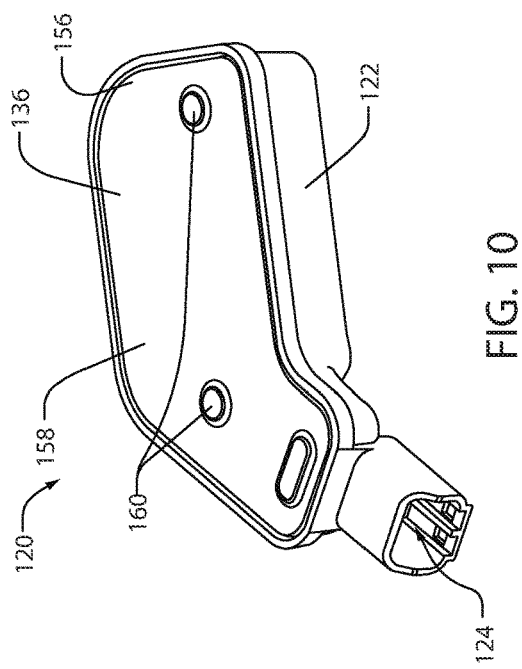

INDICATOR OPTIC FOR VEHICLE LIGHTING MODULE

CROSS-REFERENCE TO RELATED APPLICATIONS

This application claims benefit to U.S. Provisional Application No. 62/288,855, filed on Jan. 29, 2016, entitled "INDICATOR OPTIC FOR VEHICLE LIGHTING MODULE;" 62/298,261, filed on Feb. 22, 2016, entitled "INDICATOR OPTIC FOR VEHICLE LIGHTING MODULE;" and 62/312,177, filed on Mar. 23, 2016, entitled "INDICATOR OPTIC FOR VEHICLE LIGHTING MODULE," the disclosures of which are hereby incorporated herein by reference in their entireties.

TECHNOLOGICAL FIELD

The present invention generally relates to a lighting module for a vehicular mirror and more particularly to an optic device for a lighting module.

SUMMARY OF THE DISCLOSURE

According to one aspect of the present disclosure, an optic device for a vehicle indicator light is disclosed. The device comprises a receiving surface configured to receive an input emission from a light source in an emission direction and a first internal reflective surface extending at an acute angle from the light receiving surface. The first internal reflective surface is configured to direct the input emission substantially perpendicular to the emission direction. The device further comprises an intermediate surface extending from the first internal reflective surface. The intermediate surface is configured to receive the input emission from the receiving surface and the first internal reflective surface, and direct the input emission along a primary path through the body.

The device further comprises a light extraction surface extending substantially parallel to the receiving surface. The light extraction surface is configured to emit the input emission outward from the body along the primary path. A light steering surface extends from the intermediate surface substantially parallel to the light extraction surface. The light steering surface is configured to reflect stray light through the body beyond the primary light extraction surface and toward a light trap. The light trap is configured to capture the stray light.

According to another aspect of the present disclosure, a lighting module for a vehicle is disclosed. The lighting module comprises a light source configured to generate a light emission in an emission direction substantially along a forward operating direction of the vehicle. A circuit is in connection with the light source. The lighting module further comprises an optic device comprising a body forming a receiving surface. The receiving surface is configured to receive an input emission of the light emission. The optic device is configured to transmit the input emission through the body, emit a first portion of the input emission along a primary path directed toward a passenger compartment of the vehicle, and emit a second portion of the input emission along a stray light path into a light trap formed by the body and arranged substantially opposite the light extraction surface.

According to yet another aspect of the present disclosure, a lighting module for a vehicle is disclosed. The lighting module is configured to be disposed in an exterior mirror. The lighting module comprises a light source configured to generate a light emission along a forward operating direction of the vehicle and a circuit in connection with the light source. The lighting module further comprises an optic device comprising a body forming a receiving surface. The receiving surface is configured to receive an input emission of the light emission.

The optic device is configured to transmit the input emission through the body, emit a first portion of the input emission along a primary path directed toward a passenger compartment of the vehicle, and emit a second portion of the input emission along a stray light path into a light trap formed by the body and arranged substantially opposite the light extraction surface. The lighting module further comprises a housing forming a cavity configured to receive the optic device, the circuit, and the light source. The housing is configured to receive the stray light from the light trap in the cavity.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 10 is a projected view of a lighting assembly;

FIG. 11 is an exploded assembly view of the lighting assembly shown in FIG. 10;

DETAILED DESCRIPTION

Figure 1:
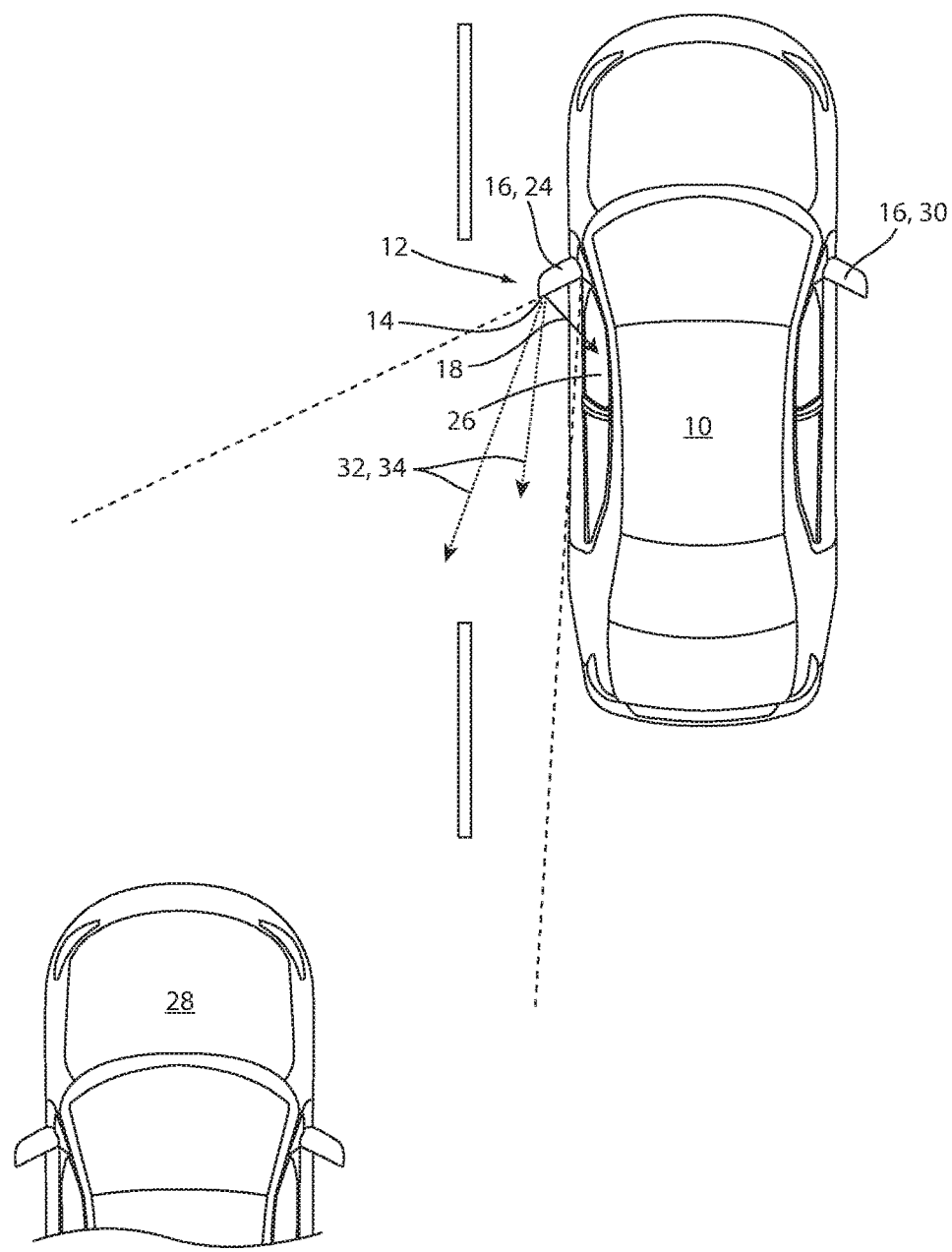
FIG. 1 is an elevational view of a vehicle comprising a lighting module configured to illuminate an indicia.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
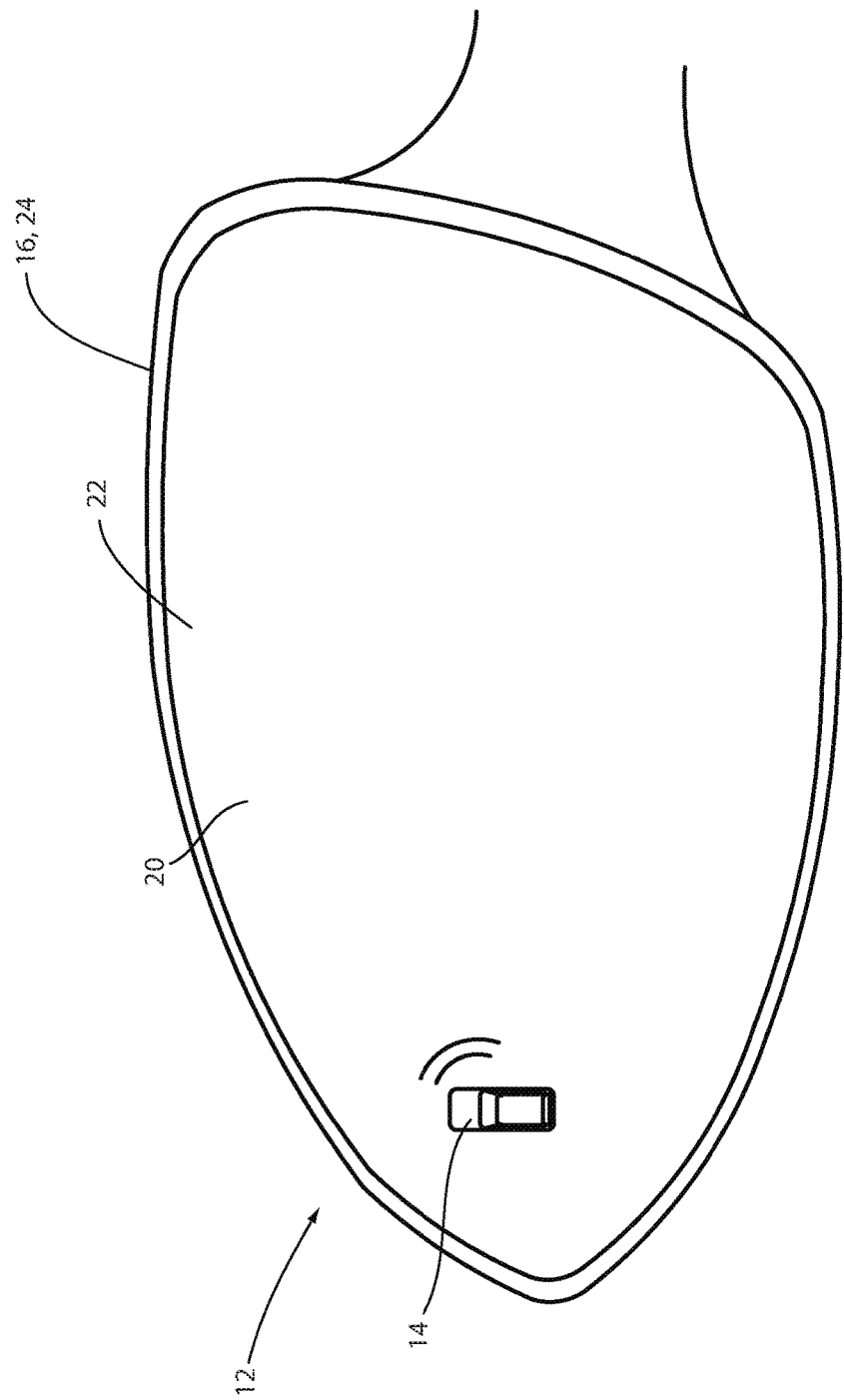
FIG. 2 is a side view of an exterior mirror assembly of a vehicle demonstrating a front surface.

FIG. 1 demonstrates an elevational view of a vehicle 10 comprising a lighting module 12 configured to illuminate an indicia 14. FIG. 2 demonstrates a side view of an exterior mirror assembly 16 of the vehicle 10. Referring to FIGS. 1 and 2, the lighting module 12 of the mirror assembly 16 is configured to illuminate the indicia 14 such that a primary emission 18 of light is directed from a front surface 20 of a mirror element 22 toward an operator or passenger of the vehicle 10. The mirror element 22 may correspond to a reflective mirror element that may be manufactured of mirrored glass having a fixed reflectance. In some embodiments, the mirror element 22 may correspond to an electrochromic (EC) element configured to vary a reflectance of the mirror element 22. The indicia 14 may correspond to an at least partially light emissive portion that may be ablated, cut and/or etched into the mirror element 22 such that light may be emitted there through.

As demonstrated in FIG. 1, the primary emission 18 is shown as an arrow extending from the indicia 14 disposed on a driver-side mirror assembly 24 toward a passenger seat or driver seat of the vehicle 10. In this configuration, the primary emission 18 may be selectively activated by the lighting module 12 to direct a visual notification to an operator or passenger of the vehicle 10 through a window 26 of the vehicle 10. The visual notification emitted from the indicia 14 may serve to alert the operator or occupant of the vehicle 10 of an approaching or trailing vehicle 28. Though the lighting module 12 is discussed in reference to the driver-side mirror assembly 24, the lighting module 12 may be applied in a passenger-mirror assembly 30 or various other mirror assemblies or display assemblies utilized in vehicles. For example, the lighting module 12 may be implemented in a video display system configured to display information to the operator of the vehicle 10.

In some mirror assemblies, a secondary emission 32 may also be emitted from the indicia 14. The secondary emission 32 may correspond to light that is not directed toward the operator or passenger of the vehicle 10 or stray light 34. In general, the stray light 34 may correspond to light that is emitted from the indicia 14 along various secondary paths, which may correspond to uncontrolled paths or stray paths of light. The stray light 34 may generally be directed away from the vehicle 10 or parallel to a longitudinal direction of the vehicle 10 and may not be projected toward the window 26. The stray light 34 may be visible to the approaching or trailing vehicle 28, which may be undesirable. The lighting module 12 disclosed herein may comprise an optic device configured to prevent or reduce the stray light 34. The secondary emission 32 is shown in FIG. 1 for illustrative purposes and may not be associated with or produced by the lighting module 12 as discussed herein.

The indicia 14 of the mirror assembly 16 may correspond to various forms of icons, graphics, and/or indicators. The lighting module 12 may be configured to illuminate the indicia 14 in response to various signals, some of which may correspond to detection indications and/or driver alerts. The indicia 14 may be utilized for various functions such as indications and driver assist functions and may be illuminated by the lighting module 12 to provide for such functions. Driver assist functions may include, but are not limited to turn signal indications, blind spot detection, obstacle detection, lane departure warning (LDW) or the like.

Figure 3:
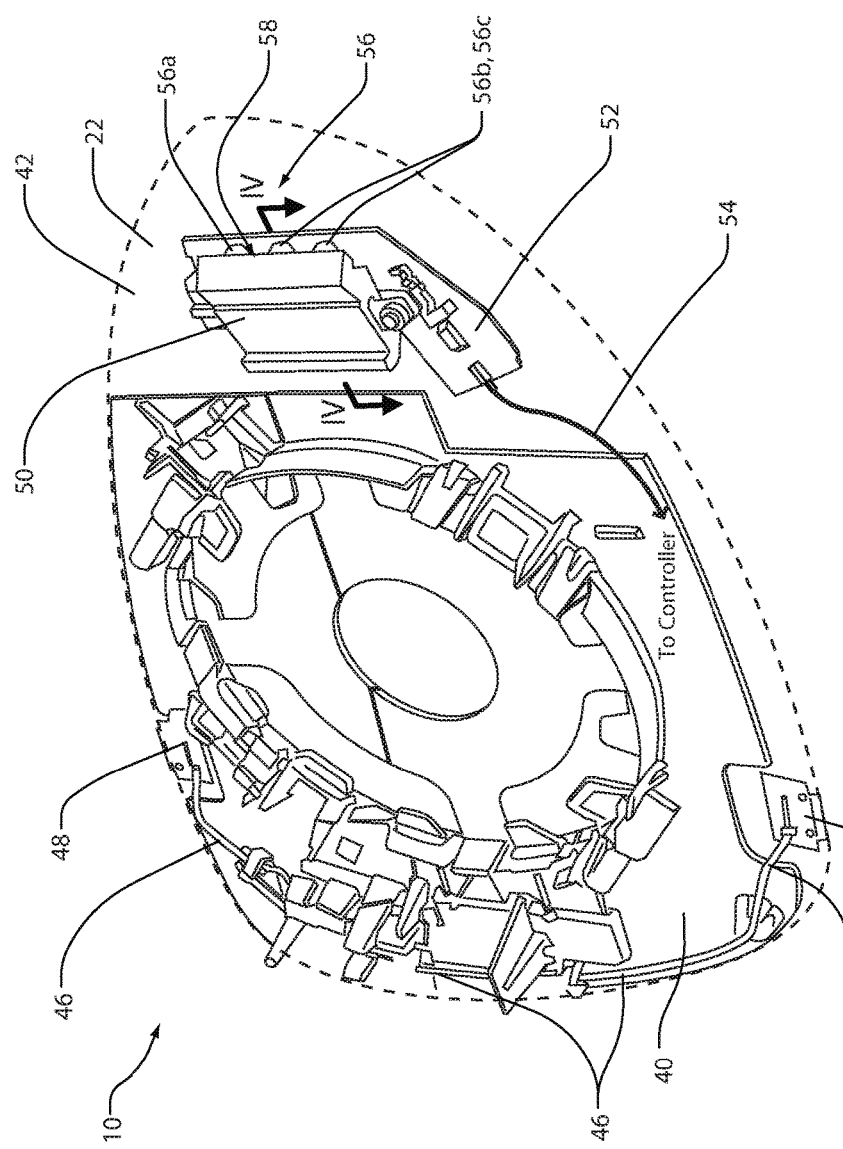
FIG. 3 is a partial assembly view of an exterior mirror assembly demonstrating an optic device configured to receive light from a lighting module.

Referring now to FIG. 3, a partial assembly view of the exterior mirror assembly 16 is shown. As demonstrated, the mirror element 22 is shown as a dashed line secured to a carrier plate 40. The carrier plate 40 may be positioned behind the mirror element 22 on a back surface 42 directed substantially toward a forward portion of the vehicle 10. As discussed previously, the mirror element 22 may correspond to an electrochromic (EC) element configured to vary a reflectance of the mirror element 22. Additionally, the mirror element 22 may comprise a heating element that may be utilized for melting ice and/or evaporating condensation or other fluids from the front surface 20 of the mirror element 22. The EC element and the heating element may be in communication with a controller via a first wiring harness 46, which is shown connecting to the mirror element 22 via conductive clips 48. In this configuration, the controller may control the reflectance of the mirror element 22 and the heating element to provide useful functions for the mirror assembly 16.

FIG. 3 further demonstrates the lighting module 12 disposed on the back surface 42 of the mirror element 22. The lighting module 12 comprises an optic device 50 and may be in communication with the controller via a control circuit 52 and a second wiring harness 54. The control circuit 52 may correspond to a printed circuit board (PCB) or various other forms of circuits or control boards. The control circuit 52 may be configured to communicate one or more signals from the controller to control a light source 56 disposed on the control circuit 52. The light source 56 may correspond to one or more light emitting sources 56a, 56b, and 56c configured to output an emission of light. The light emitting sources 56a, 56b, and 56c may correspond to light emitting diodes (LEDs) or any other form of the light source 56.

The emission of light may be directed into a receiving portion 58 of the optic device 50, which may correspond to a collimating surface A. In this configuration, the emission of light may be received by the optic device 50 and directed through the optic device 50 to form the primary emission 18. Additionally, the optic device 50 may be configured to capture the stray light 34 that may otherwise be emitted from the indicia 14 of the mirror element 22. In this way, the optic device 50 may be configured to absorb the secondary emission 32 preventing the stray light 34 from distracting an operator of a trailing vehicle 28 while providing the operator of the vehicle 10 with a visual notification.

In some embodiments, the controller may correspond to one or more circuits configured to control the EC element, the heating element, and/or the lighting module 12 via the wiring harnesses 46 and 54. In some embodiments, the controller may correspond to a plurality of control devices each configured to communicate signals via the wiring harnesses 42 and 50 to control the elements discussed herein. Control signals configured to control the lighting module 12, and the EC element may be received by one or more sensors or systems in communication with the controller. Further details regarding the controller and various sensors and/or systems in communication therewith are discussed in detail in reference to FIG. 6.

Figure 4:
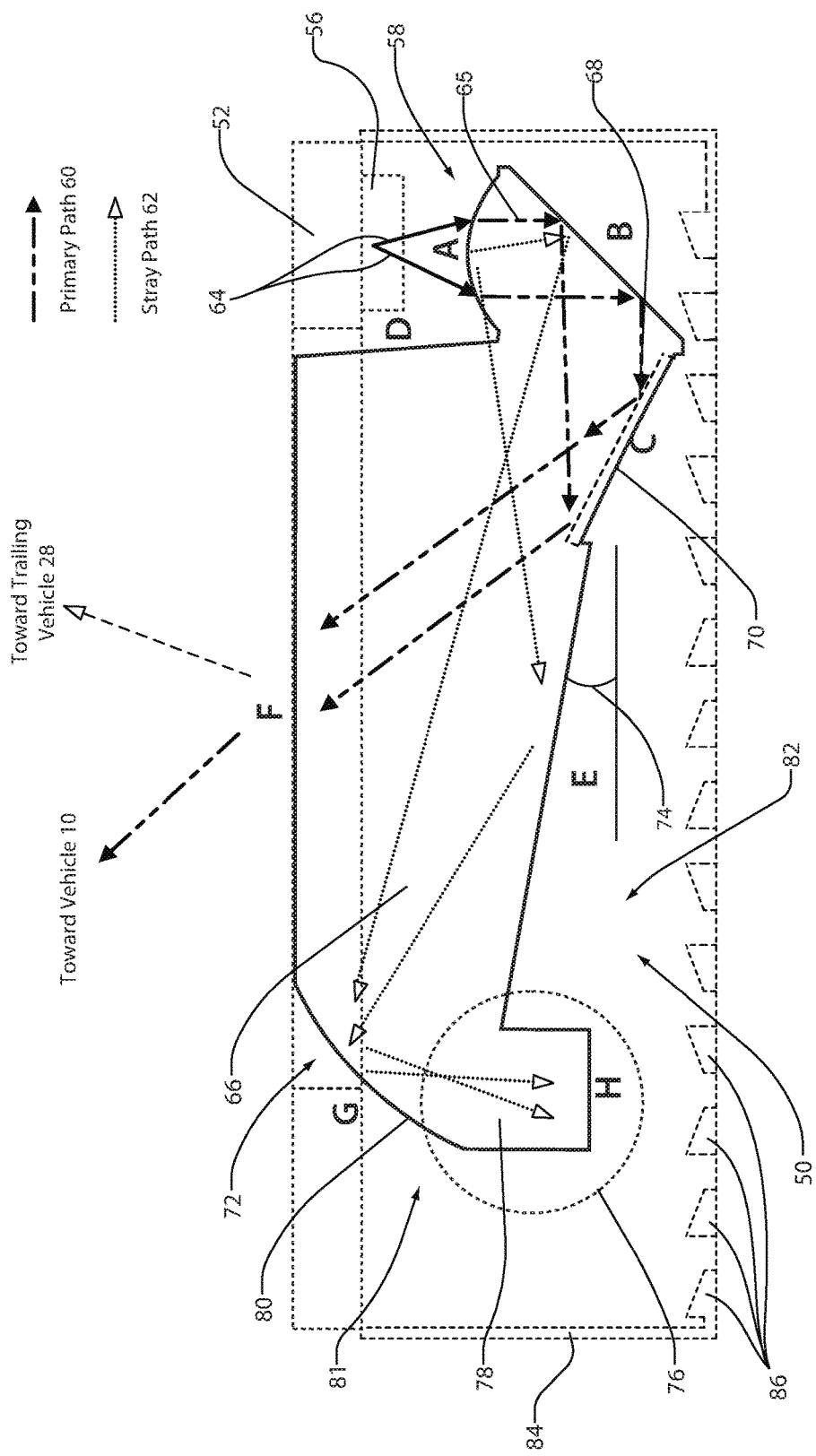
FIG. 4 is a cross-sectional view of an optic device of a lighting module along section line IV-IV demonstrating a primary reflection path of an emission from the lighting module.

Referring now to FIG. 4, a cross-sectional view of the optic device 50 along section line IV-IV is shown demonstrating a primary path 60 and at least one stray path 62 of an input emission 64 received from the light source 56. The control circuit 52 and the light source 56 are shown as broken lines for clarity. The primary path 60 of the light transmitted through a body 66 of the optic device 50 may correspond to light that is output from a primary light extraction surface F to form the primary emission 18. The at least one stray path 62 may demonstrate light that is captured by a secondary light extraction surface H. The light captured by the secondary light extraction surface H may correspond to light that may otherwise be output from the primary light extraction surface F as the stray light 34 or the secondary emission 32 discussed in reference to FIG. 1. By absorbing or redirecting the stray light 34, the optic device 50 may provide for the primary emission 18 to be directed toward the operator of the vehicle 10 while the stray light 34 is prevented from being emitted toward the trailing vehicle 28.

The optic device 50 may be of various forms of at least partially light-transmissive materials. In some embodiments, the optic device 50 may be molded or formed of an optical grade polymeric material. The optic device 50 may comprise various surfaces configured to provide for the receipt of the input emission 64, the output of the primary emission 18, and the redirection of the stray light 34. In an exemplary embodiment, the surfaces comprise the following: the collimating surface A, a first total internal reflective (TIR) surface B, a fluted surface C, an offset surface D, a light steering surface E, the primary light extraction surface F, a second TIR surface G, and the secondary light extraction surface H. Each of the surfaces A-H and the relationships among the surfaces are now discussed to demonstrate some of the novel features providing for the functionality described herein.

The collimating surface A may correspond to the receiving portion 58 of the optic device 50 configured to receive the input emission 64. The collimating surface A may form a rotationally symmetric surface (e.g. spherical, aspheric, etc.) configured to receive the input emission 64. In an exemplary embodiment, the collimating surface A may be substantially cylindrical in shape having a length formed perpendicular to the cross-section shown in FIG. 4. The collimating surface A may be configured to receive the input emission 64 and substantially direct the light along the primary path 60.

Adjacent to the collimating surface A, the first TIR surface B extends forming an included angle AB. The included angle AB may range from approximately 30 degrees to approximately 60 degrees. In some embodiments, angle AB may be approximately 45 degrees. The first TIR surface may be configured to direct light toward the fluted surface C such that the light is significantly directed along the primary path 60. The term TIR as described herein may refer to a surface configured to propagate light back into the body 66 from a surface, in this case the first TIR surface B. A TIR surface may be configured to have a greater refractive index than its environment such that the light is maintained in the body 66.

The fluted surface C may comprise fluted optics 68. The fluted optics 68 may be selected to provide a vertical spread relative to the vehicle 10. The fluted optics 68 may also be swept on a radius to provide a horizontal spread of the light along the primary path 60. A length of the fluted surface C may be dependent on the relative proportions of the indicia 14. As previously discussed, the indicia 14 may correspond to the light transmissive portion which may be etched or ablated into the mirror element 22. The length of the fluted surface C may vary from approximately 4 mm to 8 mm depending on the application. The fluted surface C may form an arc 70 having a radius ranging from approximately 15 mm to 35 mm. In an exemplary embodiment, the radius of the arc 70 may be approximately 24 mm.

The optic device 50 may also comprise the offset surface D. The offset surface D is offset relative to the primary light extraction surface F and is disposed between the primary light extraction surface F and the collimating surface A. The offset surface D may be configured such that the primary light extraction surface F may pass into an aperture 72 formed in the control circuit 52 (e.g. the PCB). In this configuration, the lighting module 12 may be configured to avoid light from the input emission 64 directly passing from the light source 56 outward through the indicia 14. A length of the offset surface may range from approximately 0 mm to 5 mm or more. In an exemplary embodiment, the length of the offset is approximately 4 mm.

The light steering surface E extends along a back surface of the optic device 50 from the fluted surface C toward the secondary light extraction surface H. The light steering surface E may correspond to an additional TIR surface or a light pipe tapper. In this configuration, the light steering surface E may function as a TIR surface to steer light that may not be extracted from surface F as the primary emission 18. For example, the light steering surface E may direct at least a portion of the stray light 34 toward the second TIR surface G and the secondary light extraction surface H. By directing the stray light 34 toward the secondary light extraction surface H, the light steering surface E may prevent the stray light 34 from being emitted away from the vehicle 10 as the secondary emission 32. In this way, the stray light 34 may be attenuated from being directed toward the trailing vehicle 28.

The light steering surface E may form an angle 74 relative the primary light extension surface F that may range from approximately 0 degrees to 20 degrees. In an exemplary embodiment, the angle 74 may be approximately 10 degrees (e.g. 10.25 degrees). The angle 74 may be adjusted to decrease a likelihood that light may be reflected back toward the trailing vehicle 28. Additionally, the angle 74 may be adjusted to assist or steer the stray light 34 toward a light trap 76. The light trap 76 may be formed by a protrusion 78 terminating at the secondary light extraction surface H. In this way, the stray light 34 may be captured such that the secondary emission 32 is diminished.

The primary light extrusion surface F extends along a front surface of the optic device 50. In operation, the primary light extrusion surface F may be configured to receive the light from the fluted surface C and output the light as the primary emission 18. The primary light extrusion surface F may be substantially free of optics that may be configured to control a distribution of the primary emission 18. For example, the front surface formed by the primary light extrusion surface F may be free of pillow optics or texture, which may reduce scattering of the primary emission 18. By avoiding scattering, the secondary emission 32 in the form of stray light 34 may be reduced.

As discussed herein, the light trap 76 may be formed by the protrusion 78 extending from the second TIR surface G.

The second TIR surface G may form a curved TIR surface having a radius 80. The curved surface of the second TIR surface G may form at least a part of a distal end portion 81 relative the receiving portion 58 leading to the light trap 76. The second TIR surface G may be configured to capture the stray light 34 that may be substantially reflected or transmitted from the light steering surface E. In this configuration, the second TIR surface G may be configured to steer the stray light 34 along the radius 80 and deliver the light to the protrusion 78 and the secondary light extraction surface H. The radius 80 of the second TIR surface G may range from approximately 3 mm to 20 mm. In an exemplary embodiment, the radius 80 may be approximately 6 mm to 7 mm (e.g. 6.7 mm).

The protrusion 78 may extend from the second TIR surface G and the light steering surface E to form a portion of the light trap 76 and terminate at the secondary extraction surface H. The stray light 34 transmitted through the body 66 may be substantially gathered and funneled toward the light trap 76 as a function of the geometry of each of the surfaces A-H, and more immediately based on the relationship between the second TIR surface G and the light steering surface E. As demonstrated, the secondary extraction surface H is configured to provide an alternate path for the stray light 34 to escape the body 66. A surface formed by the protrusion 78 and the secondary extraction surface H may be textured to allow light to scatter outward from the light trap 76. In this way, stray light 34 is emitted outward through the light trap 76 from the body 66.

The stray light 34 emitted from the body 66 may be emitted into a pocket 82 formed by a cover 84. The cover 84 may be configured to substantially enclose the optic device 50 and capture the stray light 34 such that the light is prevented from reflecting throughout the mirror assembly 16. In some embodiments, the cover 84 may comprise a plurality of baffles 86 configured to trap the light escaping from the surfaces proximate the back of the optic device 50. Such surfaces may comprise the fluted surface C, the light steering surface E, and the secondary extraction surface H.

Figure 5:
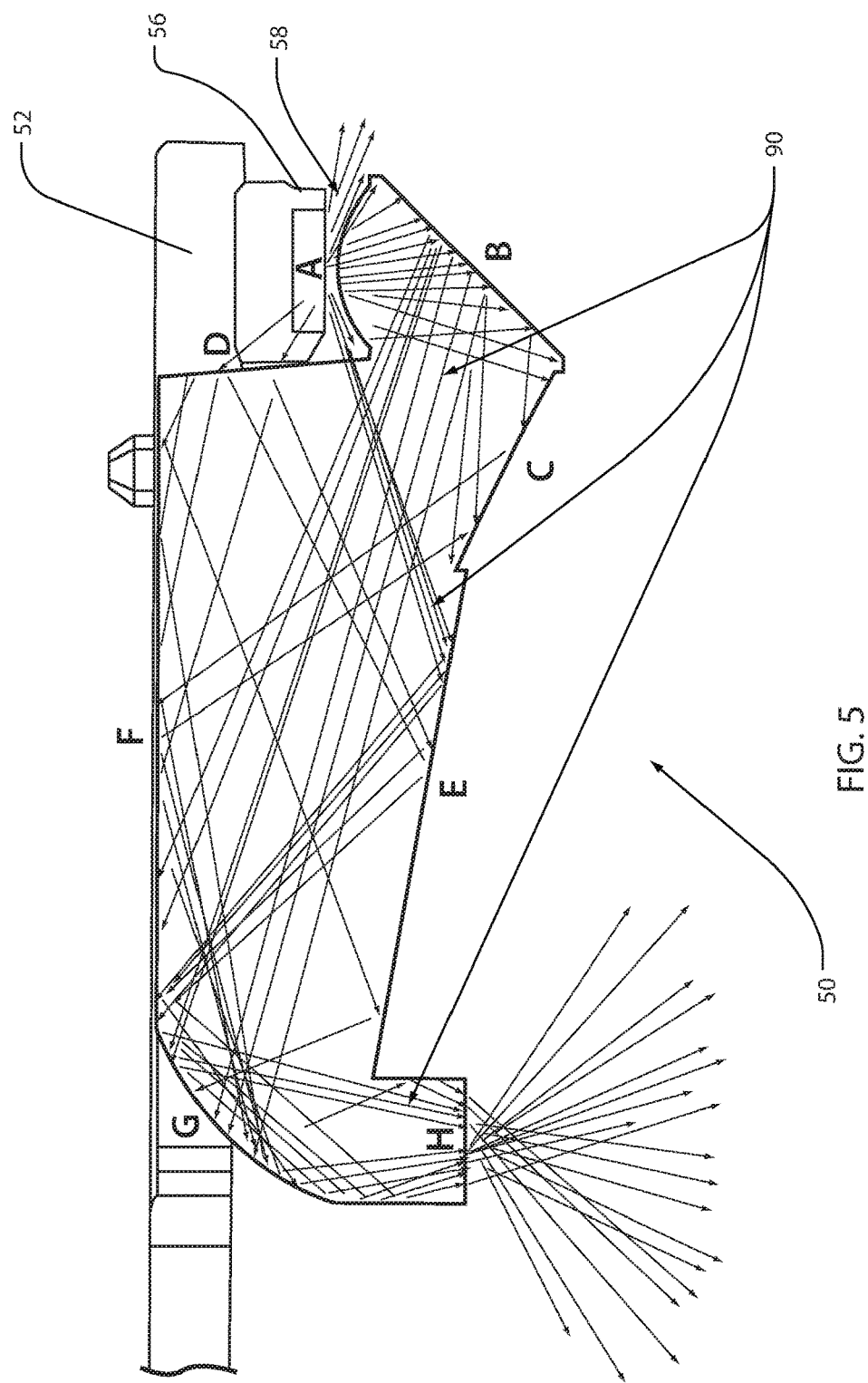
FIG. 5 is a cross-sectional view of an optic device of a lighting module along section line IV-IV demonstrating a simulation of a stray light path of an emission from the lighting module.

Referring now to FIG. 5 a cross-sectional view of the optic device 50 along section line IV-IV is shown demonstrating a simulation of the stray light 34 transmitted through the optic device 50. The light transmitted along the primary path 60 is hidden in FIG. 5 to clearly demonstrate the path of the stray light 34 from the collimating surface A to the secondary extraction surface H. As shown, the stray light 34 is demonstrated as a plurality of rays 90 transmitted through the body 66. The simulation demonstrates that a substantial portion of the rays 90 corresponding to the stray light 34 are transmitted into the light trap 76. In this configuration, the optic device 50 is demonstrated to provide for a significant reduction in the secondary emission 32.

Figure 6:
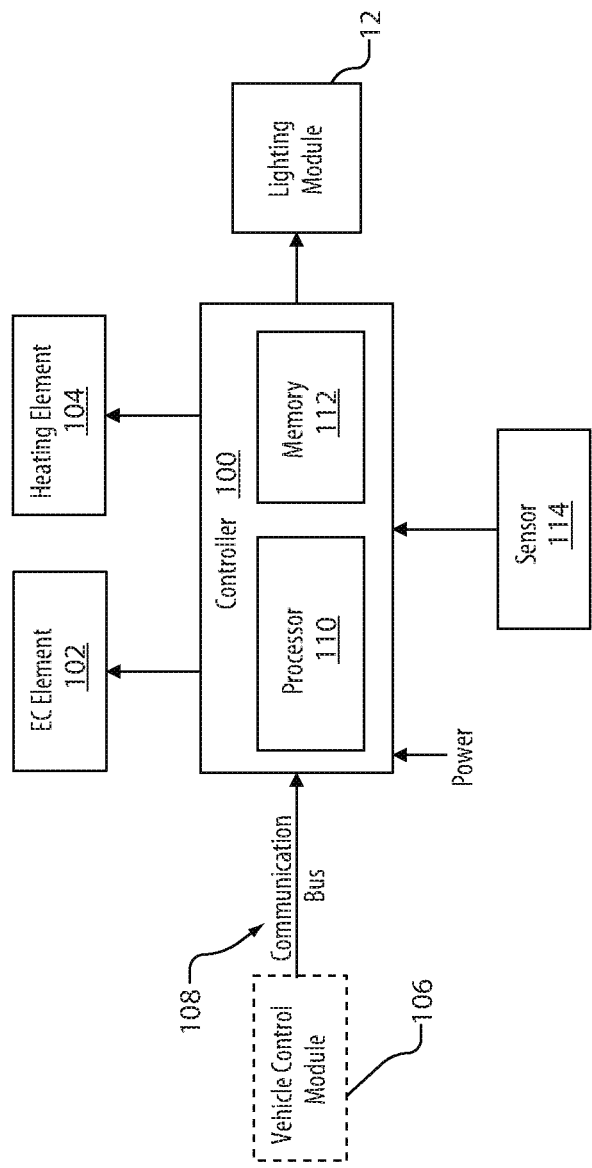
FIG. 6 is a block diagram of a controller for a lighting module.

Referring now to FIG. 6, a block diagram of the controller 100 for the lighting module 12 is shown. The controller may be in communication with the EC element 102 and the heating element 104 of the mirror element 22 via the wiring harnesses 46 and 54. The controller 80 may be in communication with a vehicle control module 106 via a communication bus 108 of the vehicle 10. The communication bus 108 may be configured to deliver signals to the controller 100 identifying various states of the vehicle 10. For example, the communication bus 108 may be configured to communicate an operating condition of the vehicle 10 (e.g., an ambient light level, a driver assist signal, a blind spot detection, a turn indicator signal, lane departure warning, etc.). In this way, the controller 100 may selectively activate the lighting module 12 in response to one or more conditions communicated by the vehicle control module 106.

The controller 100 may include a processor 110 comprising one or more circuits configured to receive the signals from the communication bus 108 and output signals to control the lighting module 12 discussed herein. The processor 110 may be in communication with a memory 112 configured to store instructions to control the activation of the light source 56. The processor 100 may receive various signals and/or messages corresponding to vehicle conditions via the communication bus 108 and various sensors in communication with the controller 100. For example, the controller may be in communication with at least one sensor 114, for example a blind spot monitor, a collision avoidance sensor, a glare light sensor, or any form of sensor. The sensor 114 may correspond to a sensor for a driver assist system. The blind spot sensor may correspond to a variety of sensors, for example a laser sensor, sonar based sensor, ultrasonic sensor, a video or image based sensor, or any form of sensor that may provide a driver assist function.

Figure 7:
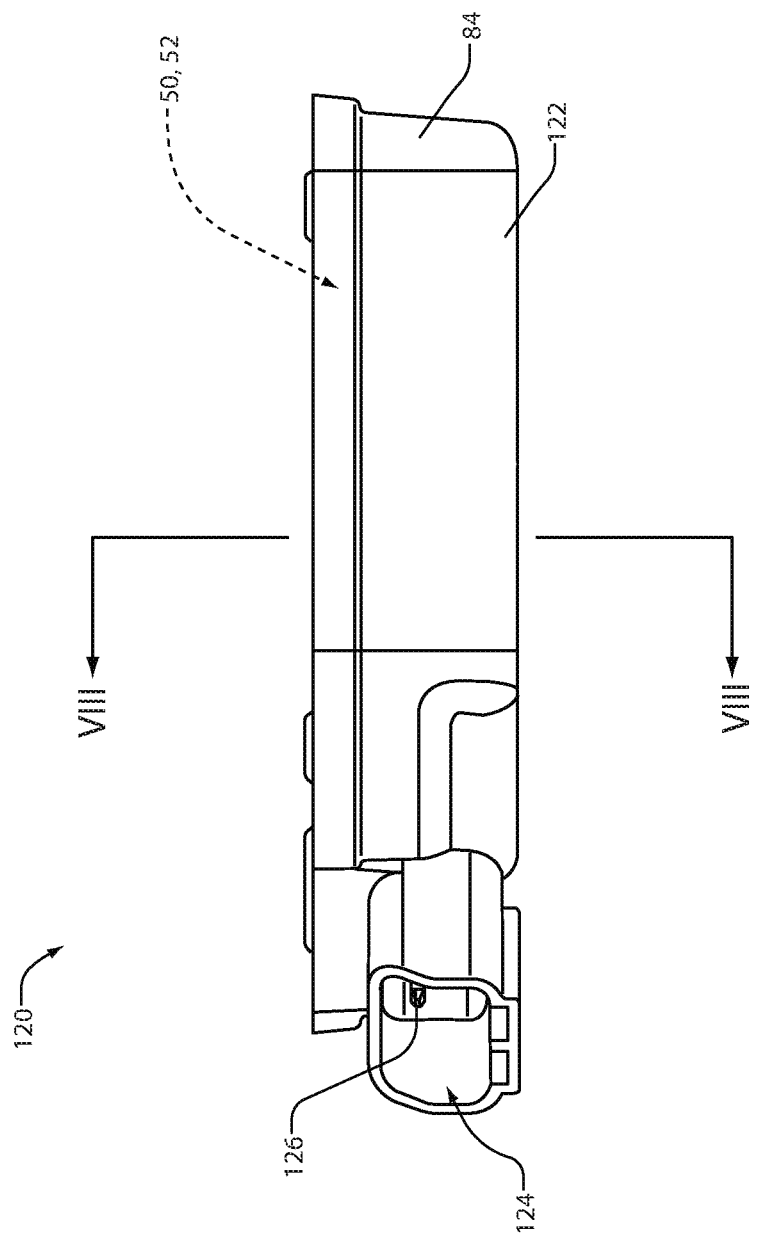
FIG. 7 is a side assembly view of a lighting assembly.

Referring now to FIG. 7, a side assembly view demonstrating a lighting assembly 120 incorporating the lighting module 10 is shown. As demonstrated in FIG. 7, the lighting assembly 120 may comprise the cover 84 forming a housing 122 configured to receive the optic device 50 and the control circuit 52. The housing 122 may further form a connection interface 124 configured to couple a connector 126 of the control circuit 52 to the second wiring harness 54. In this configuration, the housing 122 may be configured to at least partially enclose the optic device 50 and the control circuit 52 while also providing for the connection interface 124.

Figure 8:
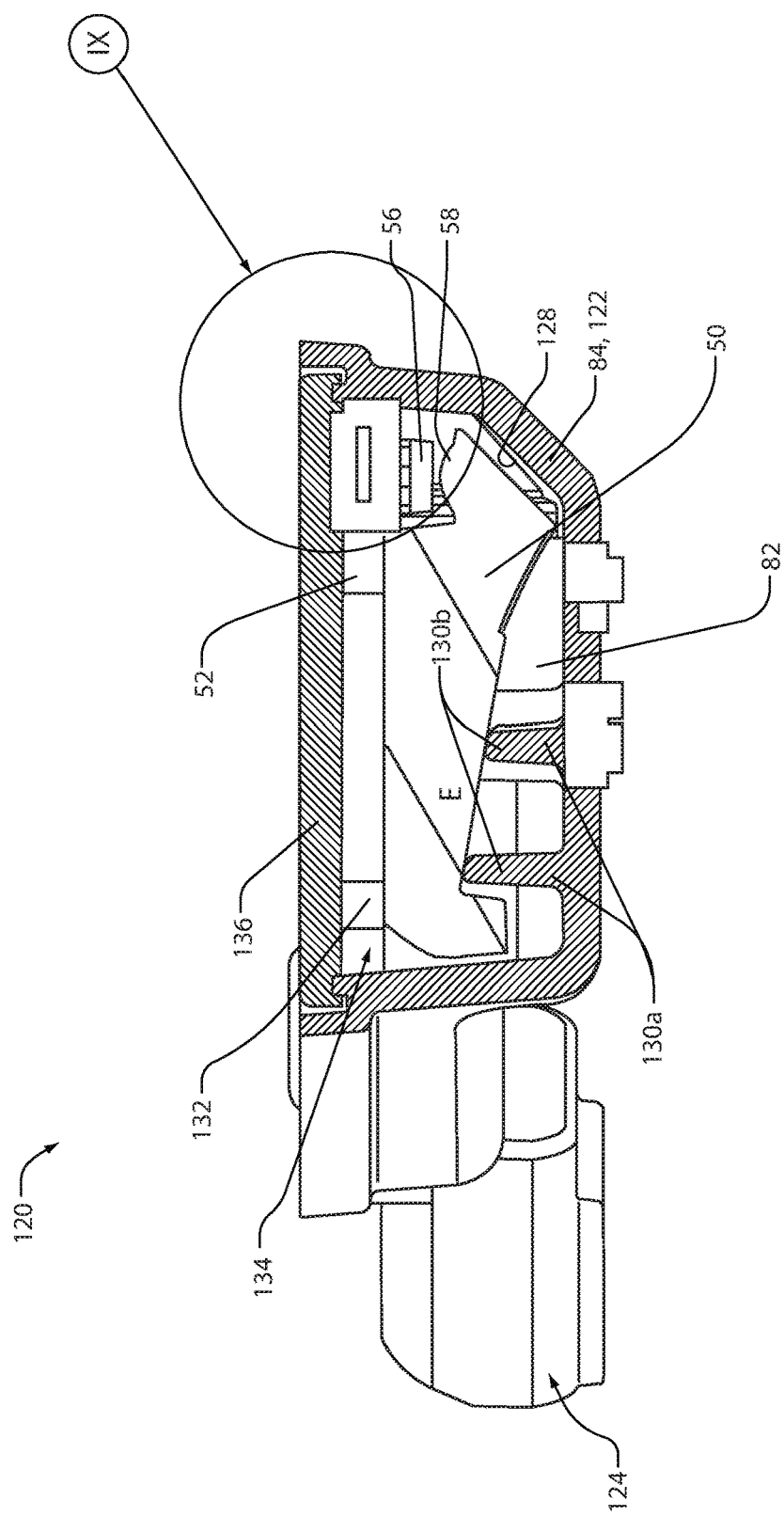
FIG. 8 is a side cross-sectional view of the lighting assembly along section line VIII-VIII.

Referring now to FIG. 8 a side cross-sectional view of the lighting assembly 120 along section line VIII-VIII is shown. The cross-sectional view demonstrated in FIG. 8 shows the optic device 52 in a similar arrangement to that shown in FIG. 4. The housing 122 comprises an interior surface 128 forming the pocket 82. Extending from the interior surface 128, the housing 122 may form at least one support structure 130. The at least one support structure 130 may form a proximal end portion 130a extending from the interior surface 128 toward a distal end portion 130b. The at least one support structure 130 may be configured to abut the optic device 52. In an exemplary embodiment, the at least one support structure 130 may be configured to contact the light steering surface E.

The housing may further be configured to receive the control circuit 52. In this configuration, the control circuit 52 may correspond to a printed circuit board forming a profile shape 132. The housing 122 may be configured to receive the profile shape 132 of the control circuit 52. In some embodiments, the housing 122 may form a receiving cavity 134 configured to complement the profile shape 132 of the control circuit 52. In this configuration, the receiving cavity 134 may form a gap with the profile shape 132 of the control circuit 52 when positioned in an assembled configuration.

The control circuit 52 may be mounted to a faceplate 136. The faceplate 136 may be configured to connect to the control circuit 52 and the optic device 50 via at least one connecting interface 138. The connecting interface 138 may correspond to one or more apertures that may be configured to receive connectors (e.g. mounting screws, etc.). Further details regarding an exemplary configuration of the housing 122, the faceplate 136, the control circuit 52, and the optic device 50 are discussed in reference to FIG. 11. In this configuration, the faceplate 136, the control circuit 52, and the optic device 50 may form a subassembly 140 of the lighting module 10.

Figure 9:
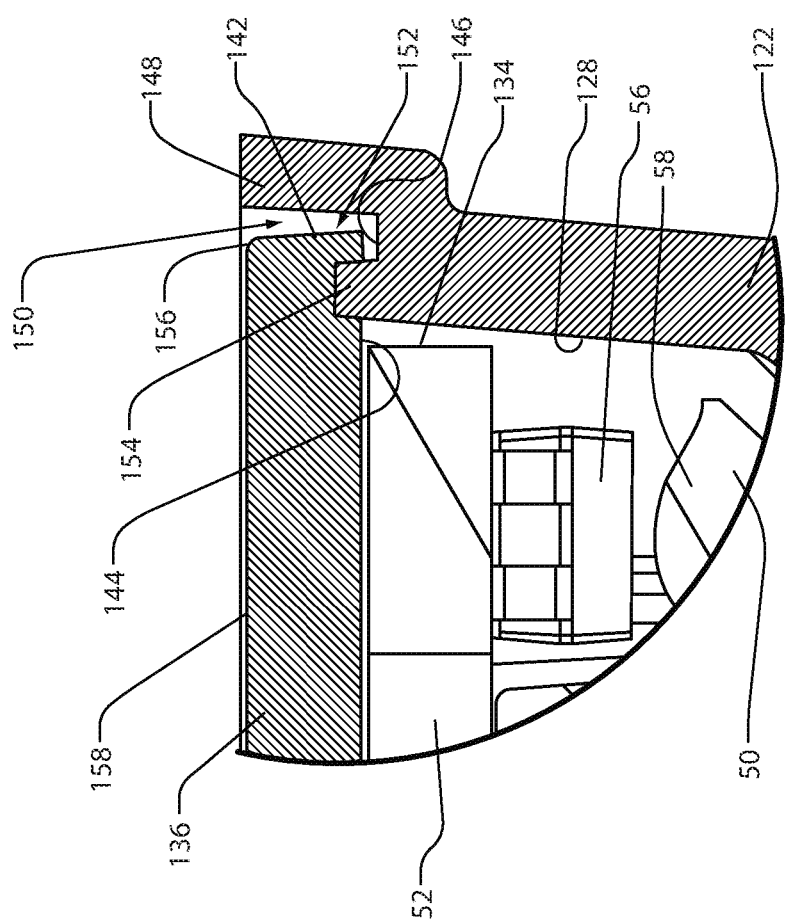
FIG. 9 is a detailed view of section IX as shown in the side cross-sectional view of FIG. 8.

Referring now to FIGS. 8 and 9, the faceplate 136 may form an engaging profile 142 that may significantly align with at least a portion of the profile shape 132. The engaging profile 142 may form an engaging surface 144 configured to engage or come in contact with a receiving ledge 146. The receiving ledge 146 may be defined by an opening of the pocket 82 formed by the housing 122. The receiving ledge 146 may extend outward between the interior surface 128 of the housing 122 and a rim portion 148. The receiving ledge 146 and the rim portion 148 may form a receiving profile 150 configured to receive and substantially align the engaging profile 142.

The engaging profile 142 and the engaging surface 144 may form an interlocking connection configuration 152 with the receiving ledge 146 and the rim portion 148. In this configuration, leakage light emitted from the light emitting devices 56 may be retained within the pocket 84. The leakage light may correspond to any light that is emitted from the light emitting devices 56 that is not transmitted into the receiving portion 58. Additionally, the leakage light may correspond to light received by the light trap 76 that is reflected outward into the pocket 82. The interlocking connection configuration 152 may form an at least partially overlapping interface between the faceplate 136 and the housing 122 configured to prevent the leakage light from escaping along the engaging profile 142.

Additionally, the receiving ledge 146 may form an engaging protrusion 154 extending substantially along the receiving profile 150. The engaging protrusion 154 may be configured to connect or contact the faceplate 136 to further prevent the leakage light from escaping along a perimeter 156 of the faceplate 136. As disclosed herein, the lighting assembly 120 may provide for a robust and cost-effective lighting device to provide for the functionality discussed herein.

Referring now to FIG. 10, a projected view of the lighting assembly 120 is shown. As demonstrated, the faceplate 136 comprises an outer surface 158 demonstrating at least one raised portion 160 corresponding to the one or more apertures of the connecting interface 138. Additionally, receiving profile 150 of the housing 122 is demonstrated extending along and in complement to the engaging profile 142 of the faceplate 136. In this configuration, the interlocking connection configuration 152 of the faceplate 136 and the housing 122 may prevent the escape of the leakage light from inside the pocket 82 formed by the housing 122.

Referring now to FIG. 11, an exploded view of the lighting assembly 120 shown in FIG. 10 is demonstrated. The exploded view may demonstrate the various components of the subassembly 140. As demonstrated in FIG. 12, the relationship of the control circuit 52 and the light emitting sources 56 to the faceplate 136, the optic device 50, and the connector 126 is more clearly visible. The control circuit 52, the faceplate 136, and the optic device 50 may be connected via the connecting interface 138 to form the subassembly 140. Additionally, the housing 122 may form the pocket 82 configured to receive the subassembly 140. As disclosed herein, the lighting assembly 120 may provide for the light to be emitted outward from the optic device 50 along the primary path 60 while limiting leakage light from escaping the pocket 82.

Figure 12:
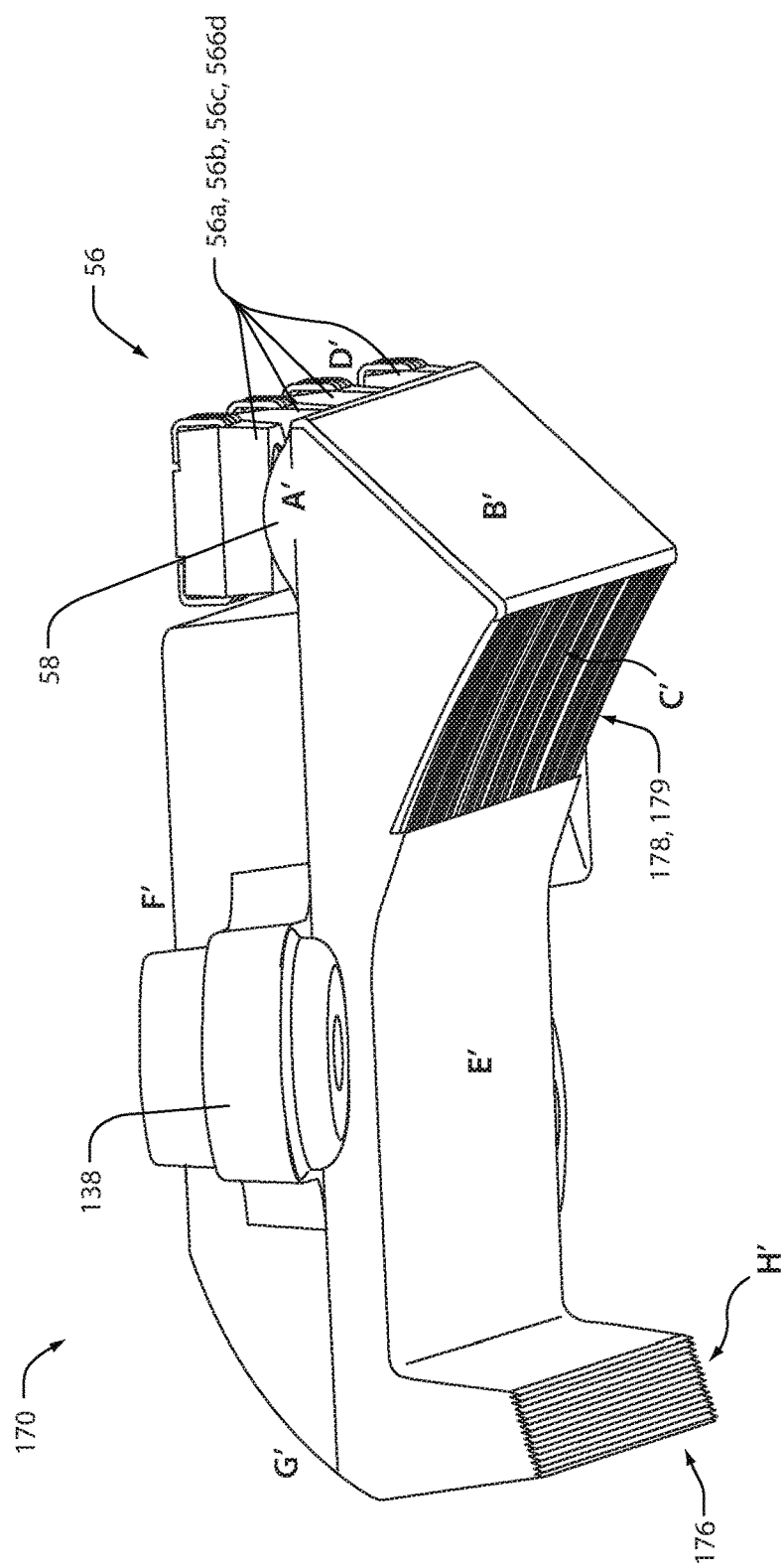
FIG. 12 is a projected view of an optic device configured to receive light from a lighting module of a lighting assembly.

Referring now to FIG. 12, a projected view of an optic device 170 is shown. The optic device 170 may be similar to the optic device 50 having similar elements like-numbered for clarity. The optic device 170 is shown in reference to the light emitting sources 56a, 56b, and 56c of the light source 56 and the connecting interface 138 configured to connect the optic device 170 to the control circuit 52. Similar to the optic device 50, optic device 170 may form a receiving portion 58 configured to receive the input emission 64 from the light source 56. In this configuration, the optic device 170 may be configured to form the primary emission 18 to illuminate the indicia 14 of the mirror element 22. The optic device 170 may further be configured to capture the stray light via a light trap 176. In this way, the optic device 170 may be configured to prevent the stray light from distracting an operator of the trailing vehicle 28 while providing the operator of the vehicle 10 with a visual notification.

Figure 13:
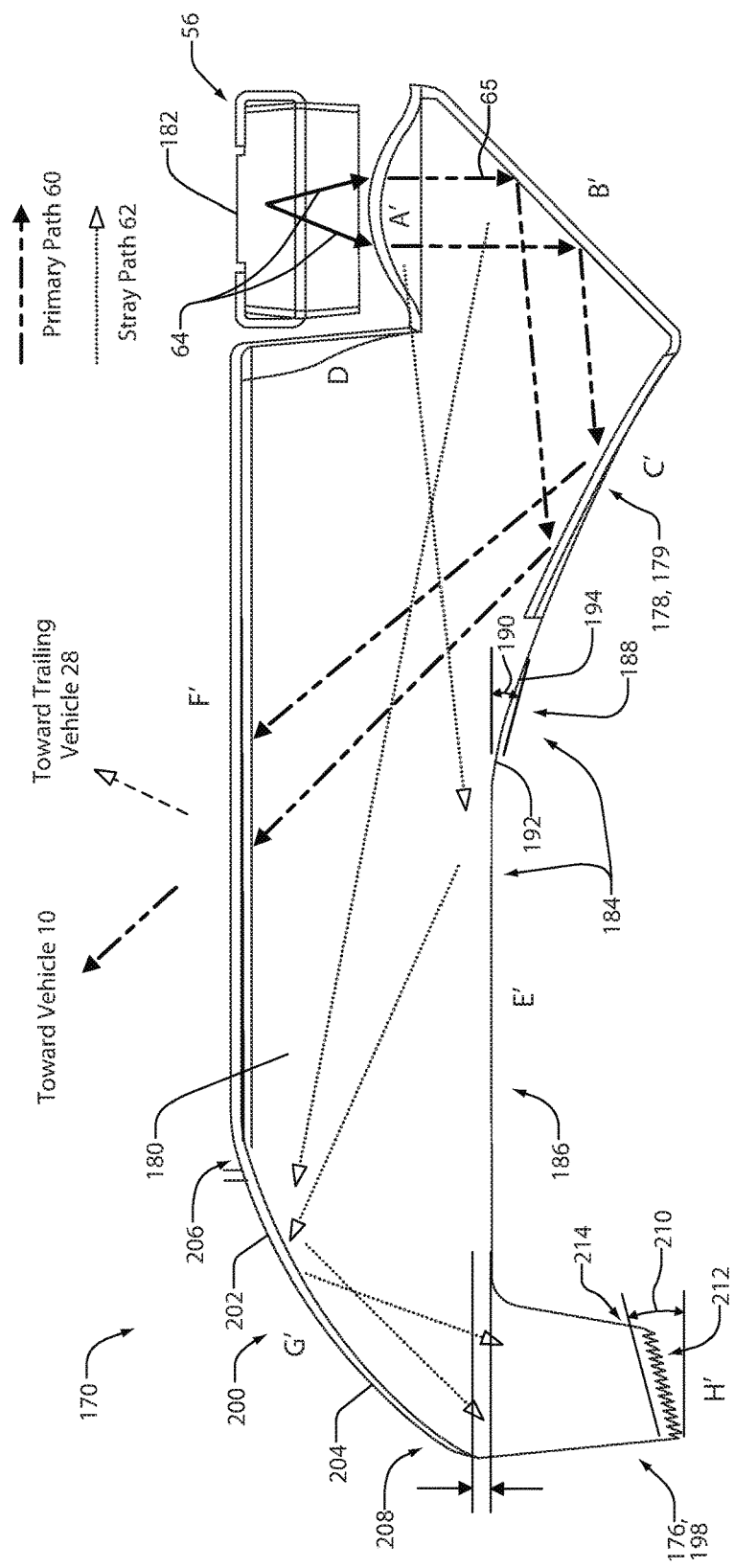
FIG. 13 is a side view of the optic device of FIG. 12 in accordance with the disclosure.

Referring now to FIGS. 12 and 13, various aspects of an exemplary embodiment of the optic device 170 are discussed in further detail. Though particular features are discussed in reference to the exemplary embodiment shown, it shall be understood that the various properties and features of the optic devices 50 and 170 may be combined or varied without departing from the spirit of the disclosure. Accordingly, the optic device 170 may comprise a body portion configured to transmit light and forming various surfaces. The surfaces may be configured to provide for the receipt of the input emission 64, the emission of the light along the primary path 60 and the extraction of the stray light along the stray path 62. In an exemplary embodiment, the optic device 170 may form the following surfaces: a collimating surface A', a first total internal reflective (TIR) surface B', a fluted surface C', an offset surface D', a light steering surface E', the primary light extraction surface F', a second TIR surface G', and the secondary light extraction surface H'. Each of the surfaces A'-H' and the relationships among the surfaces are now discussed to demonstrate some of the novel features providing for the functionality described herein.

The collimating surface A' may correspond to the receiving portion 58 or a receiving surface of the optic device 170 configured to receive the input emission 64. The collimating surface A' may form radial contour in the form of a rotationally symmetric surface (e.g. spherical, aspheric, etc.) configured to receive the input emission 64. The input emission 64 may be received from the light source 56 in an emission direction 65 demonstrated by the arrow extending from the collimating surface A' or the light receiving surface shown in FIG. 13. The emission direction 65 may be directed in a substantially forward direction substantially aligned relative to a forward operation of the vehicle 10. In an exemplary embodiment, the collimating surface A' may be substantially cylindrical in shape having a length formed perpendicular to the cross-section shown in FIG. 12. The collimating surface A' may be configured to receive the input emission 64 and substantially direct the light along the primary path 60.

As described herein, the term substantially may be utilized to describe the relationship among a variety of elements related to the optic devices 70 and 170 as well as various components of the lighting module as discussed herein. The term, "substantially," may provide for a degree of variation as discussed in reference to various relationships (e.g. geometric, positional, etc.). For example, as demonstrated FIG. 1, the mirror element 22 of the exterior mirror assembly 16 is arranged substantially perpendicular to a forward operating direction of the vehicle 10. The mirror element 22 may vary in orientation by 5-10 degrees or even more depending on the specific embodiment and desired direction of the primary emission 18 and reflected light from the mirror element 22. Accordingly, the mirror element 22 may be adjusted to accommodate a variety of relative positions of an operator of the vehicle 10 while remaining substantially perpendicular to the forward operating direction of the vehicle 10. Accordingly, the term substantially is utilized herein to clearly describe various relationships among elements discussed without limiting such relationships to an extent that could limit operation of the devices and elements disclosed.

Adjacent to the collimating surface A', the first TIR surface B' or a first internal reflective surface extends forming an included angle A'B'. The included angle A'B' may correspond to an acute angle and range from approximately 30 degrees to approximately 60 degrees. In some embodiments, angle A'B' may be approximately 45 degrees. The first TIR surface B' may be configured to direct light toward the fluted surface C' substantially perpendicular to the direction of the input emission 64. In this way, the input emission 64 is significantly directed along the primary path 60 from the first TIR surface B' and the fluted surface C'. The term TIR as described herein may refer to a surface configured to propagate light back into the body 66 from a surface, in this case the first TIR surface B'. A TIR surface may be configured to have a greater refractive index than its environment such that the light is maintained in a body 180 of the optic device 170.

The fluted surface C' may be described as an intermediate or transition surface and may comprise fluted optics 178. The fluted optics 178 may be selected to provide a vertical spread relative to the vehicle 10. The fluted optics 178 may also be swept on a radius to provide a horizontal spread of the light along the primary path 60. A length of the fluted surface C' may be dependent on the relative proportions of the indicia 14. As previously discussed, the indicia 14 may correspond to the light transmissive portion, which may be etched or ablated into the mirror element 22. The length of the fluted surface C' may vary from approximately 4 mm to 8 mm depending on the application. The fluted surface C' may form an arc 179 having a radius ranging from approximately 10 mm to 40 mm.

The optic device 170 may also comprise the offset surface D'. The offset surface D' may be extend substantially perpendicular to the primary light extraction surface F' and is disposed between the primary light extraction surface F' and the collimating surface A'. A length of the offset surface D' may range from approximately 0 mm to 5 mm or more. The offset surface D' may provide for the primary light extraction surface F' to substantially align with a mounting surface 182 of the light source 56 and may form a gap between the light extraction surface F' and the collimating surface A' or light receiving surface. The gap may be configured to accommodate the light source 56 extending from the mounting surface. The mounting surface 182 may correspond to a surface of the control circuit 52 configured to conductively connect to the light source 56.

The light steering surface E' may correspond to a compound surface 184 comprising a main portion 186 and an intermediate portion 188. The main portion 186 may correspond to a surface aligned substantially parallel to the primary light extraction surface F'. The intermediate portion 188 may correspond to an angled portion extending from the main portion 186 to the fluted surface C'. In this configuration, the main portion 186 may be configured to limit a reflection of light from external sources from reflecting from the light steering surface E' toward an operator of the vehicle. Additionally, the light steering surface E' may be configured to direct at least a portion of the stray light toward the second TIR surface G' and the secondary light extraction surface H'. For example, the light steering surface E' may be configured to reflect the stray light along the stray path 62 through the body of the optic device 170 beyond a distal extent of the primary light extraction surface F' relative to the receiving surface A' and toward the light trap 176.

The intermediate portion 188 may provide for a smooth transition between the light steering surface E and the fluted surface C'. The intermediate portion may form an angle 190 relative the primary light extension surface F that may range from approximately 0 degrees to 30 degrees. In an exemplary embodiment, the intermediate portion 188 comprises a curved transition 192 and an angled portion 194. In an exemplary embodiment, the angled portion 194 may be angled approximately 20 degrees relative the primary light extraction surface F'. In such an embodiment, the combination of the curved transition 192 and an angled portion 194 may provide for the angle 190 of the intermediate portion to effectively be approximately 16 degrees. The proportions and angles of the main portion 186 and the intermediate portion 188 may be adjusted based on the particular application of the lighting assembly 120.

The primary light extrusion surface F' extends along a front surface of the optic device 170. In operation, the primary light extrusion surface F' may be configured to receive the light from the fluted surface C' and output the light along the primary path 60. The primary light extrusion surface F' may be substantially free of optics that may be configured to control a distribution of the primary emission. For example, the front surface formed by the primary light extrusion surface F' may be free of pillow optics or texture, which may reduce scattering of the primary emission.

The optic device 170 may further comprise the light trap 176. The light trap may be formed by a protrusion 198 extending from the second TIR surface G' and the light steering surface E'. The second TIR surface G' may form complex curved surface which may correspond to a splined curve 200. The splined curve 200 may comprise a plurality of radii. For example, the plurality of radii may correspond to a first radius 202 and a second radius 204. Each of the first radius 202 and the second radius 204 may form a portion of the second TIR surface G' extending from a proximal end portion 206 at the primary extraction surface F' to a distal end portion 208 at the light trap 176. The second TIR surface G may be configured to capture the stray light 34 that may be substantially reflected or transmitted from the light steering surface E to the light trap 176.

Each of the first radius 202 and the second radius 204 may have radii ranging from approximately 3 mm to 20 mm. The first radius 202 may be proximate the primary extraction surface F' and the second radius 204 may be proximate the light trap 176. In an exemplary embodiment, the first radius 202 may be different than the second radius 204. In this way, the optic device 170 may provide for a smooth transition between the primary light extraction surface F' and the light trap 176.

The protrusion 198 may extend from the second TIR surface G' and the light steering surface E' to form a portion of the light trap 176 and terminate at the secondary extraction surface H'. The stray light transmitted through the body 180 may be substantially gathered and funneled toward the light trap 176 as a function of the geometry of each of the surfaces A'-H'. In an exemplary embodiment, the light extraction surface H' may form a light extraction angle 210 and a light extraction feature 212. In this configuration, the light trap may provide for extraction of the stray light transmitted through the body 180.

The light extraction angle 210 may form an angle ranging from approximately 5 degrees to 25 degrees relative the primary light extraction surface F'. In an exemplary embodiment, the light extraction angle 210 may be approximately 10 to 20 degrees and in some embodiments may be approximately 15 degrees. The light extraction feature 212 may correspond to one or more shapes, which may be formed in a distal end portion 214 of the protrusion 198. The light extraction feature 212 may correspond to one or more teeth, prisms, optical flutes, etc. The light extraction feature 212 may be configured to limit the reflection of the stray light within the light trap 176 by extracting light proximate the distal end portion 214.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An optic device for a vehicle indicator light comprising a body configured to transmit light, the device comprising:
    a receiving surface configured to receive an input emission from a light source in an emission direction;
    a first internal reflective surface extending at an acute angle from the light receiving surface and configured to direct the input emission substantially perpendicular to the emission direction;
    an intermediate surface extending from the first internal reflective surface, the intermediate surface configured to receive the input emission from the receiving surface and the first internal reflective surface, and direct the input emission along a primary path through the body;
    a light extraction surface extending substantially parallel to the receiving surface and configured to emit the input emission outward from the body along the primary path;
    a second internal reflective surface extending from the light extraction surface; and
    a light steering surface extending from the intermediate surface and extending substantially parallel to the light extraction surface, wherein the light steering surface is configured to reflect stray light through the body beyond the primary light extraction surface and toward a light trap formed between a distal end portion of each of the second internal reflective surface and the light steering surface relative to the light receiving surface, wherein the light trap is configured to capture the stray light.

2. The optic device according to claim 1, wherein the light steering surface is configured to reflect the stray light through the body beyond a distal extent of the primary light extraction surface relative to the receiving surface and toward the light trap.

3. The optic device according to claim 1, wherein the light extraction surface is offset from the light receiving surface.

4. The optic device according to claim 3, wherein the offset is configured to form a gap between the light extraction surface and the light receiving surface, wherein the gap is configured to accommodate a height of the light source.

5. The Optic device according to claim 1, wherein the second internal reflective surface forms a curve configured to direct the stray light from the light steering surface away from the light extraction surface and toward the light trap.

6. The optic device according to claim 1, wherein the light trap forms a protrusion extending from the light steering surface and away from the light extraction surface.

7. The optic device according to claim 6, wherein the protrusion of the light trap comprises a light extraction feature formed on a distal surface of the protrusion.

8. The optic device according to claim 1, wherein the receiving surface is formed on an opposite side of the body from the light trap.

9. The optic device according to claim 1, wherein the light trap is configured to capture the stray light such that the stray light is not reflected outward through the light extraction surface.

10. An optic device for a vehicle indicator light comprising a body configured to transmit light, the device comprising:
    a receiving surface configured to receive an input emission from a light source in an emission direction;

a first internal reflective surface extending from the light receiving surface and configured to direct the input emission substantially perpendicular to the emission direction;

an intermediate surface extending from the first internal reflective surface, the intermediate surface configured to receive the input emission from the receiving surface and the first internal reflective surface, and direct the input emission along a primary path through the body;

a light extraction surface extending substantially parallel to the receiving surface and configured to emit the input emission outward from the body along the primary path;

a second internal reflective surface extending from the light extraction surface, wherein the second internal reflective surface forms a curve configured to direct the stray light from the light steering surface away from the light extraction surface and toward the light trap; and a light steering surface extending from the intermediate surface and extending substantially parallel to the light extraction surface, wherein the light steering surface is configured to reflect stray light through the body beyond the primary light extraction surface and toward a light trap formed between a distal end portion of each of the second internal reflective surface and the light steering surface relative to the light receiving surface.

* * * * *